United States Patent
Affeldt

[15] 3,649,325
[45] Mar. 14, 1972

[54] COATING POROUS SUBSTRATES WITH SOLID RUBBER FOAM

[72] Inventor: Hans Affeldt, Bergen-Enkheim, Germany

[73] Assignee: Metallgesellschaft A.G., Frankfurt, Germany

[22] Filed: Sept. 22, 1969

[21] Appl. No.: 860,060

[30] Foreign Application Priority Data

Sept. 25, 1968 Germany.....................P 17 85 441.0

[52] U.S. Cl. .........................117/11, 117/65.2, 117/140 A, 117/161 VD, 117/163, 161/159, 161/160, 264/47, 264/321
[51] Int. Cl. ......................................B44d 1/14, B44d 1/44
[58] Field of Search..................117/65.2, 76 FE, 76 T, 8, 80, 117/11; 161/159, 160, 47; 264/41, 45, 48, 50, 321

[56] References Cited

UNITED STATES PATENTS

| | | | |
|---|---|---|---|
| 2,336,944 | 2/1943 | Madge et al. | 260/816 |
| 3,136,832 | 6/1964 | Ballmer | 117/62.2 |
| 3,362,862 | 1/1968 | King | 161/160 |
| 2,961,332 | 11/1960 | Nairn | 161/160 |
| 3,239,365 | 3/1966 | Petry | 161/160 |
| 3,293,108 | 12/1966 | Nairn et al. | 161/160 |
| 3,399,106 | 8/1968 | Palmer et al. | 161/160 |
| 3,432,380 | 3/1969 | Weber | 264/48 |

*Primary Examiner*—William D. Martin
*Assistant Examiner*—M. Sofocleous
*Attorney*—Don O. Winslow and Aaron B. Karas

[57] ABSTRACT

A method of coating porous substrates with solid rubber foam, which includes the steps of (1) applying to the substrate a thin layer of latex foam, (2) compressing the foam to destroy its foam structure, (3) applying a thicker second layer of latex foam atop the compressed thin latex layer, (4) solidifying the two layers and (5) drying and curing the solidified layers.

16 Claims, No Drawings

COATING POROUS SUBSTRATES WITH SOLID RUBBER FOAM

This invention relates to the manufacture of porous substrates having a coating or backing of solid rubber foam. More particularly, the invention relates to an improved method for applying a solid rubber foam backing to textiles, both woven and nonwoven. The invention is particularly useful in the application of foam rubber backings to tufted and woven carpets.

It is well known to provide tufted or woven carpets with solid rubber foam linings or backings which are formed from the curing of foamed rubber latex. Such backings, which are often embossed in a wide variety of patterns, provide an increase in the softness of the carpet when it is walked upon, reduce the noise of walking, provide heat insulation and improve the visual appearance of the carpet back. In many instances foam rubber backings are important to improve the dimensional stability of the carpet and, in the case of tufted carpets, to lock the tuft bights to the base fabric.

The foamed latex mixture is generally applied directly on the back of the carpet so that a certain strength is imparted to the loomed yarn loops, which does not withstand, however, major stresses, particularly in yarns of continuous fibers. In order to improve the interlocking of the tufts or loops in needlework pile carpets, it is also known to provide the back of the carpet first with a thin adhesive coat or a coat of latex, the so-called prime coat (Z.Ges.Textilindustrie, 64 (1962) p. 490). This improves the interlocking of the tufts and also the dimensional stability of the carpet. The prime coat is generally applied in a separate operation by coating the carpet with a suitable unfoamed latex mixture, drying it, and providing it with the foam coat. Other procedures provide two successive operations, where the prime coat is first applied and solidified and then the foam latex mixture is applied. If the prime coat is not solidified under the foam coat in the known methods, the liquid mixture tends to ooze through the foam coat during the embossing and smears the embossing calender and the pattern. The solidification of the prime coat can be achieved by preliminary drying of the prime coat or by gelling a latex mixture containing a sensitizing agent.

In practice it is only possible, however, to apply a sensitized latex mixture by "flatching" or wiping, if it is produced in small batches. But working with small batches in continuous operation is difficult and extremely uneconomical.

The invention therefore serves to provide a coating method for carpets which combines the priming and foam coating in one operation and makes intermediate drying of the prime coat unnecessary.

Applicant's invention therefore is directed to a method for coating porous substrates, particularly the backs of carpets, with a solid rubber foam, which method comprises the sequential steps (1) applying to the surface of a substrate a thin first layer of foamed latex, (2) applying a compressive force to the surface of the thin first layer of foamed latex substantially to destroy the foam structure of the first layer, (3) applying to the exposed surface of the compressed first layer of foamed latex a thicker second layer of ungelled foamed latex, which latex has the same composition as the latex in the first layer, (4) solidifying the thusly applied two layers of foam latex, and (5) drying and curing the layers of solidified foam latex.

The invention is likewise directed to the unique foam-coated products produced by the above-described method. These products are characterized by extremely good adhesion of the foam rubber to the substrate, which is achieved without sacrificing the cell structure of the principal foamed rubber layer.

FOAM PREPARATION

The polymer emulsion that is foamed in the practice of the present invention may contain any of the conventional agents that are required to effect the final cure of the polymer in the emulsion, such as accelerators and vulcanizing agents, together with other usual ingredients such as antioxidants and fillers. In general the original polymer emulsion contains not more than 60 percent of volatiles, and the emulsion containing all added ingredients, ready for foaming, contains not more than 45 percent of volatiles.

The foaming step is carried out in the conventional manner by the use of a blowing agent or by mechanical foaming. If a blowing agent is used, it may be any one of the conventional blowing agents which release a noncoagulating gas such as nitrogen. Alternatively, the blowing agent may be one which is decomposed by reacting with another ingredient in the emulsion to liberate a noncoagulating gas as a reaction product. If mechanical foaming is used, it may be carried out by the use of conventional whipping apparatus, or by pumping the emulsion through foaming heads of the conventional type. During the foaming step, the volume of the emulsion is increased to about five to 15 times its initial volume. The foam is then coated onto the porous substrate.

A critical aspect of the manufacture of foams from latex and other similar polymer emulsions is the means by which the wet foam is stabilized structurally from the time it is applied until it is rendered substantially mechanically stable by cross-linking. That is, the wet foam must be reinforced to hold its shape and cellular structure until sufficient drying and cross-linking of the polymer has taken place to give the foam a permanently solid structure. While this step of structural stabilization is frequently referred to in the art as gelation, in fact gelation is only one of several mechanisms which are used to obtain reinforced solidification of the foam prior to substantial curing. Other means include resin reinforced latices, soap reinforced latices and heat-thickening latices as well as combinations of these systems.

The gel-foaming reinforcing agents that may be employed by this invention may be separated into two classes, those which are generally referred to as heat gelling or heat sensitive and the delayed gelling agents. In the former, an inversion of phase of the aqueous dispersion is brought about by the application of heat; in the latter, an inversion of the phase takes place at a predetermined and controllable time interval after the addition of the gelling agent without any substantial change in temperature. It will be appreciated that the gelling effects of the delayed action gelling agents are accelerated by an increase in temperature and are therefore often used in this manner.

Among the substances which serve as gelling agents in one of the above-mentioned gelling mechanisms are calcium and zinc salts, ammonium sulphate, ammonium acetate, zinc or magnesium oxide, sodium silicofluoride and aromatic disubstituted guanidines. In some gelling systems two or more materials may be added to the latex, both of which are without effect in causing gelation. However, upon an increase in temperature these substances or materials react to produce a gelling agent. Ammonium persulfate and trioxymethylene may be used for this purpose. Zinc-ammonium complexes are also effective gelling agents for the purposes of this invention. Such complexes may be prepared by a solution of the zinc salt in ammonia or by dissolving zinc oxide in a solution of an ammonium salt. For example, a solution may be prepared as follows:

| | Parts by Weight |
|---|---|
| Zinc oxide | 6 |
| Water | 160 |
| Ammonia solution, 28° Be' | 10 |
| Ammonium Formate | 11 |

Such solutions may be used in concentrations of 1 percent to 2 percent, calculated on the weight of the latex for effecting gelation.

Other types of gelling agents which may be employed are polymeric materials such as polyvinyl methyl ether and the polyglycols.

Resin-reinforced latices are comprised of a mixture of latex and a water dispersible resin which by the application of at least mild heat will form a reinforcing network. An example of such foam system is a mixture of a carboxylated butadiene-styrene latex and a minor amount of water-soluble melamine-formaldehyde condensate resin. Numerous foam systems of this general type are illustrated in U.S. Pat. No. 3,215,647 and Canadian Pat. No. 802,956.

In soap-reinforced foam systems, the foam structure is reinforced by the use of especially high quantities of soap above that amount which would be required merely to stabilize the latex emulsion.

A fourth type of reinforcing system comprises the use in conjunction with the latex of an organic compound which upon heating will increase the viscosity of the continuous (water) phase of the foamed emulsion. Methyl cellulose is a most effective compound of this type.

The method of the invention may be used with any of the above-mentioned foam-solidifying systems.

The latex foams suitable for this invention may be prepared from a variety of curable or vulcanizable polymeric materials which are in the form of a stable aqueous dispersion of polymeric particles. Such aqueous dispersions include the synthetic latices that are prepared by emulsion polymerization of one or more monomeric materials, natural rubber latices and blends thereof.

Among the suitable synthetic elastic latices there may be mentioned: polybutadiene 1,3, copolymers of butadiene-1,3 and styrene (GR-S), the oil resistant copolymers of butadiene-1,3 and acrylonitrile (GR-A or Buna-N), poly-(2-chlorobutadiene-1,3) or neoprene, and other well-known rubbery copolymers of conjugated dienes and one or more copolymerizable olefinically unsaturated monomers, e.g., methyl methacrylate, vinylchloride, vinylidiene chloride, and the like. Water dispersions of polyisobutylene (butyl rubber), isoprene, rubbery organic polysulfide polymers (Thiokol rubber), polyacrylates, polyvinyl polymers are also suitable.

It is a further advantage of the invention that synthetic rubber latices of the acid copolymer type prepared from conjugated dienes and carboxyl-containing copolymerizable vinyl monomers e.g., mono and poly-carboxylic acids and their partial esters may be utilized. Such latices may be either acidic or alkaline. When ammonium salts are used as gelling agents, alkaline latices are required since these types of chemical gelling agents reduce the pH to cause gelling. The synthetic acid copolymer latices, such as carboxylic butadiene-nitrile latices, for example, a butadiene-acrylonitrile-methacrylic acid latex, are also advantageous in that they may be cured without the conversioned curing aids to provide foams of high strength for many purposes.

Generally, the selected latex is compounded in the usual manner by the addition of conventional compounding materials in amounts well-known to the art, including antioxidants, fillers, inhibitors, stabilizers, accelerators, gelling agents, vulcanizing and curing agents. Pigments may advantageously be incorporated for coloring the entire foam uniformly.

According to the invention, a thin coat of foamed latex mixture is first applied on the back under light pressure, and a thicker back layer of the same foamed latex mixture is applied directly on this prime coat without intermediate drying, after which the latex of both coats is solidified simultaneously, dried and cured. Embossing, if desired, will be done by conventional means after the foam is solidified, but before any substantial curing is completed.

For the practical realization of the method according to the invention it is advisable to proceed as follows: Priming and foam coating are effected with the same foamed latex mixture. To this end a small portion of the foamed latex mixture is conducted in front of a doctor, hereafter called priming doctor, which has direct contact with the carpet web and which is in front of the roll doctor, seen in feeding direction, for the application of the latex foam coat. While the roll doctor for the application of the latex foam coat is not flush with the back of the carpet, thus regulating the height of the latex foam coat, the priming doctor is flush with the back of the carpet. Due to this measure the thin latex foam coat deposited in front of the priming doctor is crushed, the foam structure is substantially destroyed, except for the foam which lies initially between the protruding bights. By this means a thin film is worked into the tufts and fiber bundles so that extremely good anchorage of the tufts is achieved. Instead of a simple doctor a roll can also be used. The friction is preferably increased by a self-contained drive of the roll in which the incorporation of the priming mixture is improved.

The latex foam coat proper, forming the backing, is applied directly behind the priming doctor without the interposition of a drying zone on the back of the carpet treated with the priming doctor and the foamed latex mixture.

The thin layer or primer foam coating will usually comprise from about 200 to about 350 grams of total solids per square meter. While the thicker foam layer will be comprised of at least about 800 grams, basis total solids, per square meter, depending on the desired thickness. Between about 800 and 1200 grams are preferred.

The carpet (or other substrate) is then advanced to a zone in which solidification of the foam is achieved. Usually, this zone is merely a heating zone in which solidification of the foam is obtained by partial dewatering, gelling or thickening of the foam, depending upon the kind of foam-reinforcing system which is employed.

After the foam layers have been solidified, the composite structure can then be embossed if this is desired.

Embossing of the solidified foam layer may be effected by using various techniques known in the foam industry. One technique comprises simply embossing the foam with an embossed roller having the desired pattern thereon under pressure. The foam layer and substrate are passed between the embossed roller and a flat roller under a pressure of about from 5 to 10 p.s.i. Since the method of this invention is particularly suitable for a continuous type operation, the embossing roller and flat roll are rotated at the same speed as the conveyor system used to transport the foam latex through the gelation zone. The pattern-forming surface on the embossing roller may be in the form of various configurations including a "waffle" design, a honeycomb design, or it may simply consist of a plurality of projecting pins arranged in parallel rows. Moreover, the depth of embossing may vary depending upon the desired foam application. It will also be appreciated that the resulting foam product may exhibit a resilient spongy appearance or may have an appearance of a solid molded rubber depending upon the embossing pressure applied. For example, in preparing certain carpet backings and underlays a dense embossed foam product advantageously provides extra strength without extra weight and gives a structural support to the carpet and provides a firmer base without reducing its resilience.

The solidified foam layers, whether embossed or not, are dried and then cured by passing through a heated zone, for example a hot air oven or steam chest, at an elevated temperature for a period of several minutes to as long as a few hours. The temperature at which the foam is cured will usually be between about 200° and 500° F., the upper temperature of which being dependent upon the softening point or thermal degradation temperature of the substrate. In general, the time of cure will be varied inversely with the temperature of cure for a given foam system. As used herein, the terms "curing," "vulcanization" and "cross-linking" are interchangeable.

It will be appreciated that the method of the invention is particularly suited for continuous type operation. However, both operations and those employing a combination of the two may also be used.

The following examples further illustrate the practice of the invention:

EXAMPLE I

This example illustrates the preparation of the four types of latex systems for foam discussed hereinabove. The following latex compounds are prepared by blending the listed ingredients into a stirred compounding tank.

| Function | Compounding Ingredients: A | |
| --- | --- | --- |
| Latex base | Carboxylated butadiene-styrene latex (55 BD/40 ST/5 Acid) | 100.0 |
| Frothing agent | Sodium lauryl sulfate | 2.0 |
| Antioxidant | Alkylated phenol | 3.0 |
| Filler | Barium sulfate, clay | 150.0 |
| Pigment | Carbon black | |
| Froth Stabilizer | Methyl cellulose | 0.5 |
| Foam reinforcing resin | Melamine-formaldehyde condensate resin | 10.0 |
| Cell detackifier | Silicone oil | 2.0 |
| Resin catalyst | Ammonium chloride | 1.0 |

| Function | Compounding Ingredients: B | |
| --- | --- | --- |
| Latex base | Mixture of natural and cold SBR latex (50/50) | 100.0 |
| Frothing agent | Potassium oleate | 3.0 |
| Antioxidant | Alkylated phenol | 3.0 |
| Filler | Barium sulfate, clay | 150.0 |
| Pigment | Carbon black | |
| Froth stabilizer | Sodium polyacrylate | 0.5 |
| Vulcanizing agent | Sulfur | 3.0 |
| Accelerators | Zinc oxide, zinc diethyldithiocarbomate and zinc 2-mercaptobenzothiazole | 4.0 |
| Gelling agent | Ammonium acetate | 4.0 |
| Sensitizing agent | Triethyl trimethylene triamine | 2.0 |

| Function | Compounding Ingredients: C | |
| --- | --- | --- |
| Latex base | Mixture of natural and cold GRS latex (50/50) | 100.0 |
| Frothing agent | Disodium N-tallow-β-iminodiproprionate | 7.0 |
| Antioxidant | Alkylated phenol | 3.0 |
| Filler | Barium sulfate, clay | 150.0 |
| Pigment | Carbon black | |
| Froth stabilizer | Sodium polyacrylate | 0.3 |
| Accelerators | Zinc oxide, zinc dibutyldithiocarbomate, mercaptobenzothiazole | 9.0 |

| Function | Compounding Ingredients: D | |
| --- | --- | --- |
| Latex base | Latex of copolymer of butadiene, styrene and N-methylolacrylamide (55 BD/41 ST/4 MOAMD) | 100.0 |
| Frothing agent | Sodium lauryl sulfate | 1.0 |
| Antioxidant | Alkylated phenol | 3.0 |
| Filler | Barium sulfate, clay | 150.0 |
| Pigment | Carbon black | |
| Vulcanizing agent | Sulfur | 2.0 |
| Accelerators | Zinc oxide, zinc diethyldithiocarbomate | 5.0 |
| Heat thickening agent | Methyl cellulose | 0.5 |
| Cell detackifier | Silicone oil | 5.0 |

EXAMPLE II

Using the separate latices as compounded in Example I, each latex compound is pumped to an Oakes Mixer in which it is aerated to form a foam having a density of 500–525 gms./qt. A rolled length of carpet is unwound and passed with its jute webbing exposed over a continuous conveyor system which carries the carpet under a priming doctor blade which is flush with the carpet back and then to a secondary doctor blade mounted about 14 inches downstream of the primary doctor and which is mounted about three-sixteenths inch above the back of the carpet. The aerated foam is pumped simultaneously to distribution heads located ahead of the doctor blades and continuously flowed onto the carpet backing. The foam to the priming doctor is thereby compressed, which substantially destroys its foam structure. The foam to the secondary doctor blade is flowed onto the still wet first foam layer and retains an essentially uncompressed height of about three-sixteenths inch. The carpet thusly coated is then passed to a solidifying zone comprising a bank of overhead-mounted infrared lamps. Here the coated foam is heated for 1–10 minutes to a temperature of about 300° F. From the solidification zone, the solidified foam-backed web is passed without substantial cooling through a curing oven in which the final strength of the foam is developed by cross-linking of the latex polymer chains. Overhead gas burners are used to heat the backing to a temperature of about 300° F. for a period of 7–10 minutes. Upon emerging from the curing oven the continuous web of foam-backed carpet is rewound. The elapsed times in the solidification zone for each of the four compounds is as follows:

| | |
| --- | --- |
| Compound A | 10 minutes |
| Compound B | 2 minutes |
| Compound C | 8 minutes |
| Compound D | 7 minutes |

The considerably shorter solidification time for compound A arises from the fact that the gelation takes place rapidly without the necessity for water removal, whereas the others all require some higher degree of water removal to effect solidification.

Representative samples from the four lengths of carpet reveal that the tuft lock of the carpeting foam backed in accordance with the invention is substantially equal to that obtained with liquid latex precoatings. Moreover, there is no tendency for the second thicker foam layer to separate from the first thin foam layer.

What is claimed is:

1. A method for coating porous substrates with solid rubber foam comprising the sequential steps
   1. applying to the surface of a substrate a thin first layer of foamed latex containing at least one foam structure stabilization agent,
   2. applying a compressive force to the surface of the thin first layer foamed latex substantially to destroy the foam structure of the first layer,
   3. applying to the exposed surface of the compressed first layer of foamed latex a thicker second layer of foamed latex, which latex has the same composition as the latex in the first layer,
   4. solidifying the thusly applied two layers of ungelled foam latex, and
   5. drying and curing the layers of solidified foam latex.

2. The method of claim 1 in which the solidification of the foam layers is accomplished by heating thereof.

3. The method of claim 1 in which thin first layer of foamed latex is applied at a coating weight of from about 200 to about 350 grams/m.$^2$, basis total solids.

4. The method of claim 1 in which the thicker second layer of foamed latex is applied at a coating weight of at least about 800 grams/m.$^2$, basis total solids.

5. The method of claim 1 in which the foamed latex contains heat sensitizing agents and is solidified by the formation of a gel structure as a result of the limited application of heat without substantial drying or curing of the foam.

6. The method of claim 1 in which the foamed latex contains a water-dispersible reinforcing resin and is solidified by partial dewatering of the foam without substantial curing of the foam.

7. The method of claim 1 in which the foamed latex contains a high amount of soap sufficient to maintain the structure thereof upon partial removal of water therefrom and is solidified by partial dewatering of the foam without substantial curing thereof.

8. The method of claim 1 in which the foamed latex contains a minor amount of a heat-thickening water-soluble organic compound and is solidified by the application of heat thereto.

9. The method of claim 1 in which the foamed latex also contains a minor amount of a heat-thickening water-soluble organic compound.

10. The method of claim 9 in which the heat-thickening water-soluble organic compound is methyl cellulose.

11. The method of claim 1 in which the solidified foam layers are embossed prior to drying and curing.

12. A composite structure comprising a porous substrate at least one surface of which is covered by a foam rubber coating applied in accordance with the method of claim 1.

13. The composite structure of claim 12 in which the substrate is a fibrous substrate.

14. The composite structure of claim 12 in which the substrate is a nonwoven textile fabric.

15. The composite structure of claim 12 in which the substrate is a woven carpet the backing of which is covered with a foam rubber coating.

16. The composite structure of claim 12 in which the substrate is a tufted carpet the backing of which is covered with a foam rubber coating.

* * * * *

UNITED STATES PATENT OFFICE
CERTIFICATE OF CORRECTION

Patent No. 3,649,325    Dated March 14, 1972

Inventor(s) Hans Affeldt

It is certified that error appears in the above-identified patent and that said Letters Patent are hereby corrected as shown below:

Column 5, line 51, "mercaptobenziothiazole" should read -- zinc mercaptobenzothiazole -- .

Signed and sealed this 24th day of October 1972.

(SEAL)
Attest:

EDWARD M. FLETCHER, JR.    ROBERT GOTTSCHALK
Attesting Officer       Commissioner of Patents